INVENTOR.
LAWRENCE K. MULHOLLAND
BY
ATTORNEYS

Oct. 9, 1962 L. K. MULHOLLAND 3,057,642
SUSPENSION APPARATUS
Filed Feb. 15, 1960 3 Sheets-Sheet 2

INVENTOR.
LAWRENCE K. MULHOLLAND
BY
ATTORNEYS

Oct. 9, 1962 L. K. MULHOLLAND 3,057,642
SUSPENSION APPARATUS

Filed Feb. 15, 1960 3 Sheets-Sheet 3

INVENTOR.
LAWRENCE K. MULHOLLAND
BY
ATTORNEYS

United States Patent Office 3,057,642
Patented Oct. 9, 1962

1

3,057,642
SUSPENSION APPARATUS
Lawrence Keith Mulholland, 3655 Midland Road,
Saginaw, Mich.
Filed Feb. 15, 1960, Ser. No. 8,659
12 Claims. (Cl. 280—124)

This invention relates to apparatus for yieldably maintaining a pair of relatively movable members in predetermined relation and more particularly to a suspension unit especially adapted for use in a medium or heavy duty castering wheel assembly, but which is adapted for use in all instances where the storage or dissipation of energy in an elastic member is desirable.

An object of the invention is to provide a suspension or analogous device which is adaptable to a wide variety of uses including automotive front and/or rear wheel suspension units, suspension units for commercial vehicles such as industrial trucks, trailers, and the like, and in other instances where the storage or dissipation of spring energy may be desired.

A further object of the invention is to provide a suspension device or the like having wide ranges of capacity and deflection.

Another object of the invention is to provide apparatus of the kind described which is capable of use not only as a spring suspension unit but also forms a structural part of the apparatus with which it is associated.

Another object of the invention is the provision of apparatus of the class described which is compact in size, economical to produce, simple to assemble, and rugged and durable in use.

Other objects and advantages of the invention will be pointed out specifically or will become apparent from the following description when it is considered in conjunction with the appended claims and the accompanying drawings, in which:

Figure 1:
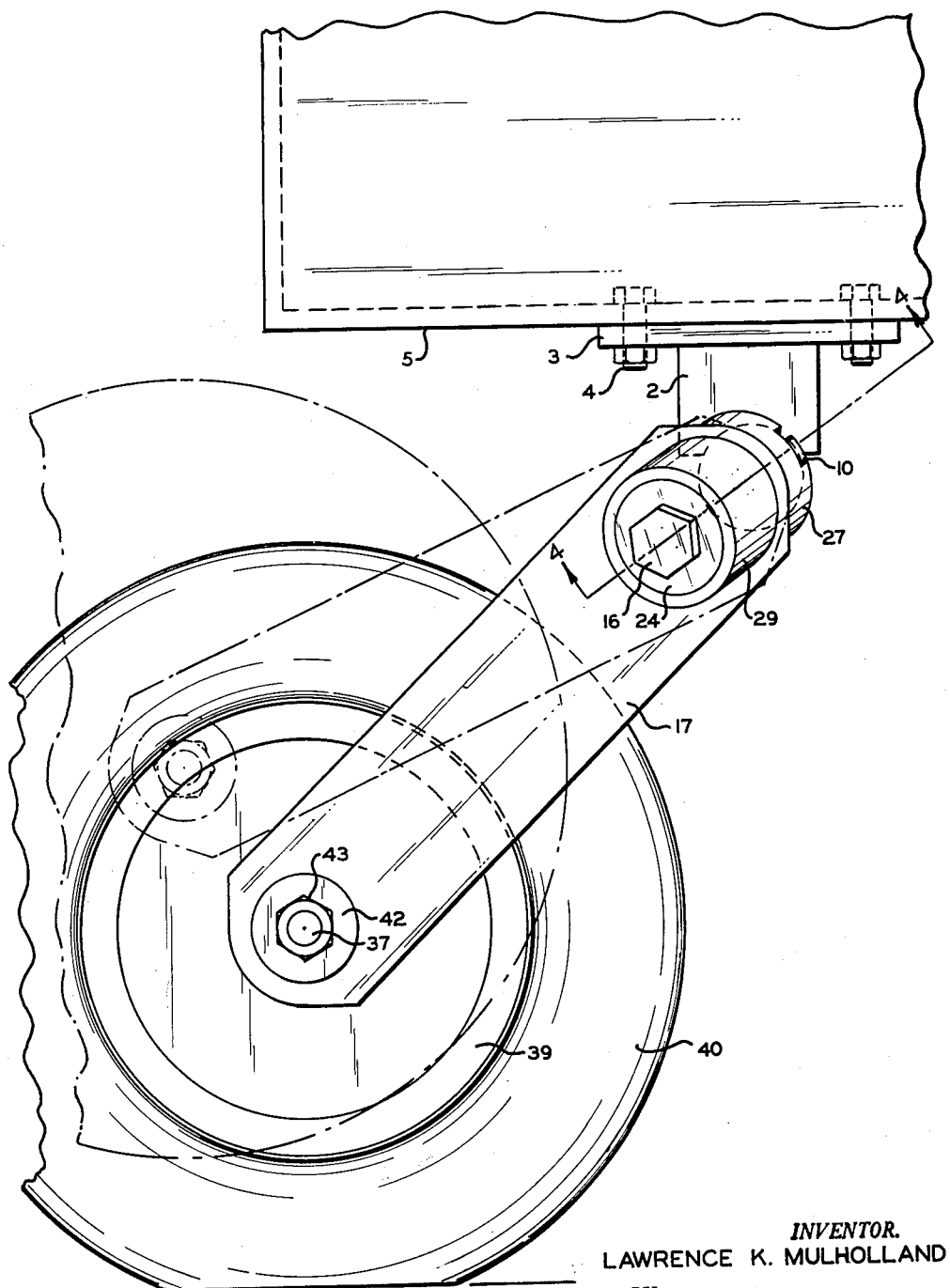
FIGURE 1 is an enlarged, fragmentary, side elevational view of apparatus constructed in accordance with the invention and adapted for use as a rear wheel suspension unit.

Apparatus formed according to one form of the invention is illustrated in the drawings as comprising a mounting block 1 to which is welded or otherwise suitably secured a pair of attaching legs 2 which, in turn, are welded or otherwise fixed to a plate 3 that may be secured by bolts 4 or the like to the bottom of an industrial cart or similar vehicle 5. Although the plate 3 is shown as being fixed to the cart 5, the fixed connection therebetween could be replaced by a swivel or castering connection of conventional construction, if desired.

Figure 7:
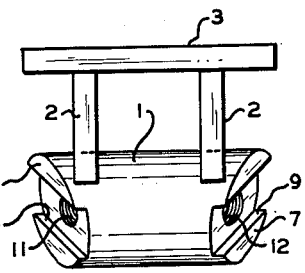
FIGURE 7 is a rear elevational view of a portion of the apparatus shown in FIGURE 3.
Figure 4:
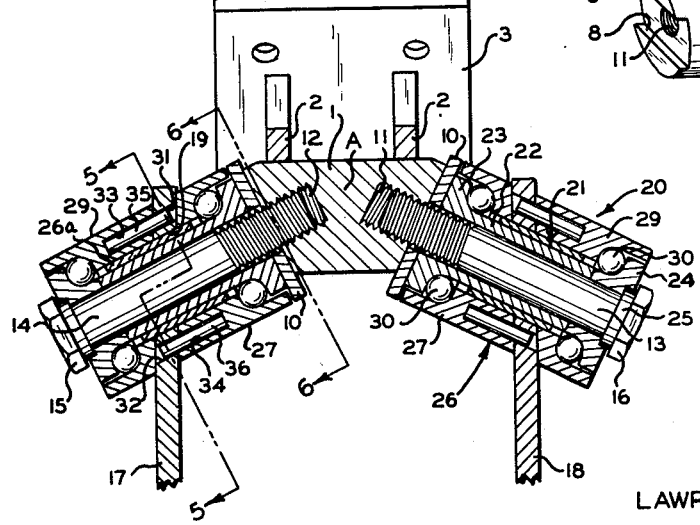
FIGURE 4 is a sectional view taken on the line 4—4 of FIGURE 1.

As is perhaps best shown in FIGURES 4 and 7, the ends of the mounting block 1 terminate in surfaces 6 and 7 which converge along lines extending rearwardly and downwardly. Each of the surfaces 6 and 7 is slotted as at 8 and 9, respectively, for reception of a substantially rectangular stop plate 10 having a thickness corresponding substantially to the depth of the associated slot so as snugly to fit therein. Each end of the block 1 also is bored as at 11 and 12 and interiorly threaded for the reception of a correspondingly threaded bolt or spindle 13 and 14, respectively. Each of the spindles 13 and 14 is provided with a head 15 and 16, respectively, by means of which the spindle may be threaded into or retracted from its associated bore. The construction and arrangement of the parts thus far described are such that the spindles 13 and 14, when threaded into their associated bores, diverge from a common point A therebetween (see FIGURE 4) both downwardly from the horizontal and rearwardly from a plane passing through the point A and being parallel to the longitudinal axis of the mounting block 1.

Figure 2:
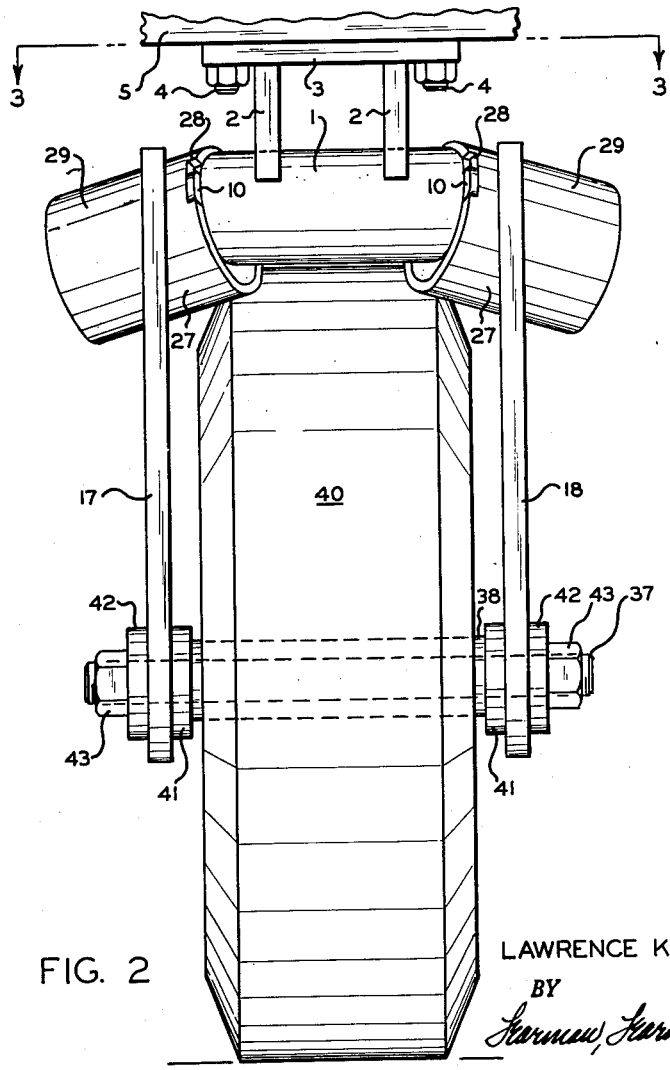
FIGURE 2 is a fragmentary, front elevational view of the apparatus shown in FIGURE 1.

The apparatus includes a pair of links or lever members 17 and 18 journaled on the spindles 13 and 14 at corresponding ends by means yet to be described for rocking movement about axes differing from the axes of the spindles 13 and 14. Each lever 18 may be formed of steel or other resilient material having a high modulus of elasticity and, as is best illustrated in FIGURES 2 and 4, each of the levers 17 and 18 parallels one another and is mounted equidistant from the point A. Each of the levers is provided with an opening 19 substantially larger than the associated spindle 13 or 14 and which is bored through each of the levers at such an angle to the plane of the latter as to correspond to the angle at which the spindles extend downwardly from the horizontal so as to enable each of the levers 17 and 18 to lie in and form substantially a vertical plane.

Figure 3:
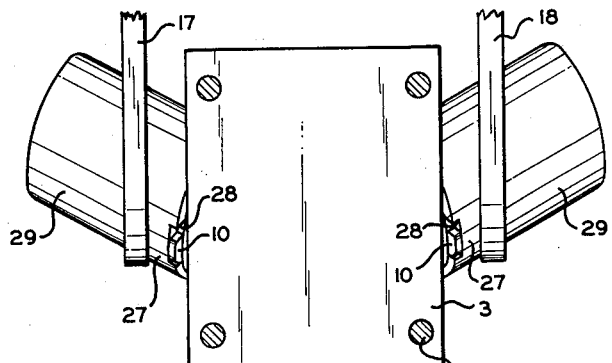
FIGURE 3 is a sectional view taken on the line 3—3 of FIGURE 2.
Figure 6:
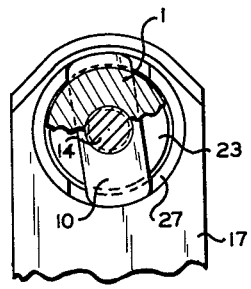
FIGURE 6 is a sectional view taken on the line 6—6 of FIGURE 4.

Means for journaling each of the levers 17 and 18 comprises a bearing assembly designated generally by the reference character 20 composed of an inner bearing race 21 having a tubular body portion 22 which receives a substantial portion of the associated spindle, the tubular member 22 terminating at one end in a ball race 23 which abuts the associated stop plate 10. The inner race also includes a ball race 24 which abuts the tubular body portion 22 and which similarly receives the spindle 13. If desired, the race 24 may be recessed for the reception of an annular shoulder 25 on each of the spindles 13 and 14. The bearing structure also includes an outer race 26 similarly composed of two parts. The first part comprises a sleeve-like element 27 having a diameter corresponding substantially to the length of the stop plate 10 and having notches 28 formed in its wall to receive the stop plates 10. The notches 28 are substantially wider than the width of the stops 10, as is best shown in FIGURES 2, 3 and 6, so as to permit relative movement between the elements 27 and the stop members 10 for a reason to be explained later. Between the members 21 and 26 may be located a sintered bronze or other suitable bushing 26a.

The second element 29 of the outer race member 26 also is a generally cylindrical element which telescopes over the inner race element 24. Each of the bearing members 27 and 29 includes ball races which cooperate with the ball races of the inner race member to retain ball bearings 30 between the inner and outer race members.

The outer race member 26 can perhaps best be described as constituting a cylinder which has been cut transversely of its longitudinal axis and at an angle thereto such that each bearing element 27 and 29 presents substantially a wedge-shaped appearance. The angle at which the elements 27 and 29 are cut should be such that, when the elements 27 and 29 are assembled with the inner race member 21 and the levers 17 and 18, the wedge-shaped surfaces of the outer bearing elements will be flush with the opposite surfaces of the levers 17 and 18 and will lie on the same plane as the latter. The adjacent ends of the elements 27 and 29 bear forcibly against the opposite faces of their respective lever members and act on the latter to maintain them parallel. The force with which the elements 27 and 29 bear against their respective levers may be adjusted by manipulation of the threaded spindles 13 and 14.

Figure 5:
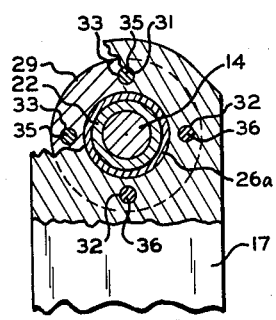
FIGURE 5 is a sectional view taken on the line 5—5 of FIGURE 4.

As is best illustrated in FIGURES 4 and 5, each of the levers 17 and 18 not only is provided with the opening 19, but also is equipped with a plurality of openings 31 and 32 which parallel the opening 19. The outer race element 29 is provided with blind bores 33 adapted to be aligned with the two openings 31 and the outer race element 27 also is provided with blind openings 34 adapted to register with the two openings 32. A pin 35 is received in each of the openings 33 and 31 and a similar pin 36 is received in each of the openings 32 and 34. As a result, each of the levers is pinned to both of its outer race elements 27 and 29 in such manner that rocking of the lever 17 causes corresponding rocking of the two bearing outer elements, but in opposite directions. The significance of this construction will be pointed out subsequently.

At the other ends of the levers, each is provided with an opening for the reception of a wheel spindle 37 having a spanner sleeve 38 thereon and on which is journaled for rotation one or more wheels 39 equipped with a pneumatic or other kind of tire 40. The tread of tire 40 may be considered a laterally extending force receiving surface since road shocks are applied to this surface. The spanner sleeve abuts at its opposite ends a pair of retaining washers 41 which bear against the levers 17 and 18 and similar washers 42 bear against the outer surfaces of the levers. The wheel mounting apparatus is maintained in assembled relation by means of nuts 43 threaded on the ends of the spindle 37.

When the apparatus has been assembled in the manner described and forms part of a wheel suspension unit as illustrated, the levers 17 and 18 will be substantially parallel to one another as is indicated in FIGURE 2 and will be inclined downwardly and rearwardly as long as the part 5 is not subjected to vertical shocks caused, for example, by traveling over an uneven surface. In either their downward or rearward inclination the spindles 13 and 14 may be considered laterally skewed relative to the cart 5, wheel spindle 37, and the tire 40. When the cart is subjected to vertical shocks, however, so as to cause relative vertical movement between the wheel 40 and the cart, the suspension apparatus is capable of yielding so as to allow the shocks to be absorbed. Deflection of the wheel upwardly from the full line position shown in FIGURE 1 to the chain line position causes each of the levers 17 and 18 to be rocked or rotated about the associated spindles 13 and 14, but the rotation of the levers 17 and 18 is about axes different from the axes of the spindles 13 and 14. Since the spindles 13 and 14 are not parallel with each other, the axes of rotation of the levers 17 and 18 are not parallel to one another.

The arrangement of the journaling means is such that upward swinging movement of the wheel 40 causes the levers 17 and 18 to move orbitally so as to tend to separate the lower ends of the levers from one another. The lower ends of the levers, however, are maintained a fixed distance apart and, consequently, the levers are subjected to linear bending stresses intermediate their ends. Furthermore, the rocking movement of the levers about the non-parallel axes while they are forcibly maintained a fixed distance apart at their lower ends subjects each of the levers to torsional stresses. Thus, relative vertical movement of the wheel and the cart towards one another stresses the levers both linearly (by bending) and torsionally to absorb the force or energy of the shock to which the apparatus is subjected. When the shock has been fully absorbed, the energy stored in the stressed levers is sufficient to return them to their initial parallel positions.

The maximum deflection to which the suspension apparatus may be subjected is determined by the relationship between the stop blocks 10 and the recesses 28 formed in the bearing member 27. As has been pointed out earlier, the recesses or notches 28 are substantially wider than the width of the stop blocks 10 so as to permit movement between the bearing elements 27 and the stop blocks. The limit of deflection of the suspension apparatus is determined by engagement between the stop block 10 and the edges of the notches 28 and the differences in widths of the blocks and the notches will be so selected as to permit the desired deflection of the suspension for a given load capacity.

The capacity of the suspension and its spring rate may be varied by varying the angular relationships between the spindles and the mounting block and between the levers and their mounting means. In other words, varying the angles at which the spindles diverge downwardly or rearwardly and making corresponding adjustments with respect to the bearing openings formed in the levers 17 and 18 will result in varying the capacity and frequency of the suspension apparatus. In the illustrative embodiment of the invention, the spindles 13 and 14 are inclined downwardly from the horizontal substantially 26° and are inclined rearwardly so that they form an angle of substantially 109°. These relationships work out very well for a wheel assembly having a capacity of three hundred pounds, but they may be varied, if desired, to obtain other capacities.

Depending on the original arrangement of the levers with the bearing means, the apparatus may be conditioned to maintain a pair of relatively movable members in spaced apart relation or, alternatively, to maintain a pair of relatively movable members adjacent to one another. For example, the apparatus can be conditioned for use as a door closer so as yieldably to maintain a door in closed relation with respect to its mounting means. In such a case, it would not be necessary to include double links and mounting means of the kind shown but it would be possible to use only a single lever and a corresponding bearing structure.

The disclosed embodiment is representative of a presently preferred form of the invention, but, as has been indicated hereinbefore, the invention is susceptible of modification. Accordingly, this disclosure is intended to be illustrative rather than definitive. The invention is defined in the claims.

I claim:

1. Suspension apparatus comprising a pair of spaced, substantially parallel, resilient lever members; means journaling said lever members adjacent to corresponding ends for rotation about axes which diverge relatively to said members from a point between them; and wheel journaling means connecting the other ends of said lever members and maintaining the spacing therebetween, whereby rotation of said lever means about said axes stresses said lever members both torsionally and linearly.

2. Suspension apparatus as set forth in claim 1 wherein the axes of said journaling means diverge in two directions from said point.

3. Suspension apparatus comprising mounting means; a pair of substantially parallel, resilient lever members; means connecting each of said lever members to said mounting means for rotation relative thereto about non-parallel axes; wheel means; and means connecting said wheel means to each of said lever members for exerting a force on the latter tending to maintain said lever members in substantially parallel relation, rotation of said lever members about said non-parallel axes causing said members to be stressed both torsionally and linearly.

4. The apparatus set forth in claim 3 wherein each of said axes diverges in two directions from a point between said lever members.

5. Suspension apparatus comprising a mounting block; a pair of spindles mounted in said block and extending therefrom in such directions as to diverge from a point therebetween; a pair of resilient lever members rockably journaled one on each spindle, said lever members being substantially parallel to one another; force exerting means associated with each of said spindles and acting on said lever members to exert a force on the latter tending yieldably to maintain said lever members substantially parallel; and wheel means connected to each of said lever members also tending to maintain said members substantially parallel, the force exerted on said lever members by said force exerting means being yieldable to permit rocking of said lever members about said spindles whereby said lever members are stressed both torsionally and linearly.

6. The apparatus set forth in claim 5 wherein said force exerting means for each lever member comprises a pair of bearing devices located one on either side of said lever member so as to exert a force thereon.

7. The apparatus set forth in claim 6 including means for adjusting the force exerted by said bearing devices on each of said lever members.

8. The construction set forth in claim 5 wherein each of said spindles diverges from said point in two directions.

9. The construction set forth in claim 8 wherein said spindles diverge downwardly at an angle of substantially 26° to the horizontal and diverge from one another at an angle of substantially 109°.

10. Suspension apparatus comprising mounting means; a load engaging member having a generally laterally extending, force receiving surface; a pair of resilient lever members, one on each side of said load engaging member; means connecting one end of each of said lever members to said mounting means for rotation relative thereto about laterally skewed axes non-parallel to said surface; and means connecting said load engaging member to each of the opposite ends of said lever members, rotation of said lever members about said skewed axes upon application of a load to said force receiving surface causing said lever members to be stressed both torsionally and linearly.

11. Suspension apparatus comprising; mounting means; wheel means spaced from said mounting means and having a generally laterally extending load engaging surface; axle means for the wheel means having generally laterally extending surface portions generally parallel to the load engaging surface; at least one resilient, incompressible lever member mounted to said axle means upon said generally laterally extending surface portions thereof and extending angularly to said axle means generally alongside said wheel means; means connecting one end of said resilient lever member for rotation relative to said mounting means about a laterally skewed axis non-parallel to the laterally extending surface portions of the axle means on which it is mounted; and means connecting said axle means and mounting means to resist rotation of said lever member freely about said skewed axis so that rotation of said resilient lever member upon application of a load to said load engaging surface stresses said resilient member torsionally and linearly.

12. Suspension apparatus comprising; mounting means; load engaging means spaced from said mounting means and having a generally laterally extending load engaging surface; support means for the load engaging means having generally laterally extending surface portions generally parallel to the load engaging surface; said support means including at least one resilient, incompressible lever member extending angularly to said laterally extending surface portions and having a first end mounted to said laterally extending surface portions; means connecting the other end of said lever member to said mounting means for rotation relative to said mounting means about a laterally skewed axis non-parallel to said laterally extending surface portions; and restraint means connecting said support means and mounting means to resist rotation of said lever member freely about said skewed axis so that rotation of said resilient lever member about said skewed axis upon application of a load to said load engaging surface stresses said resilient member torsionally and linearly.

References Cited in the file of this patent

UNITED STATES PATENTS

| | | |
|---|---|---|
| 1,602,022 | Hetland | Oct. 15, 1926 |
| 2,254,325 | Slack | Sept. 2, 1941 |
| 2,582,426 | Greene | Jan. 15, 1952 |
| 2,768,002 | Rabe et al. | Oct. 23, 1956 |